(12) United States Patent
Kolev et al.

(10) Patent No.: US 6,414,944 B1
(45) Date of Patent: Jul. 2, 2002

(54) MANAGEMENT OF SPOTBEAM SELECTION INFORMATION IN SATELLITE MOBILE COMMUNICATION SYSTEMS

(75) Inventors: Javor Kolev, Cary; Anthony Swanchara, Apex; Brett Pantalone, Willow Spring, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/168,829

(22) Filed: Oct. 8, 1998

(51) Int. Cl.[7] ............................................. H04B 7/185
(52) U.S. Cl. ....................................... 370/316; 455/403
(58) Field of Search ............................... 370/316, 401, 370/534; 455/403, 407, 431, 12.1, 550, 13.2, 575

(56) References Cited

U.S. PATENT DOCUMENTS

| | | | |
|---|---|---|---|
| 5,752,187 A | | 5/1998 | Frank et al. |
| 6,073,013 A | * | 6/2000 | Agre et al. .................. 455/428 |
| 6,105,060 A | * | 8/2000 | Rothblatt .................... 709/219 |
| 6,208,857 B1 | * | 3/2001 | Agre et al. .................. 455/428 |
| 6,356,740 B1 | * | 3/2002 | Malcolm et al. .............. 455/71 |

FOREIGN PATENT DOCUMENTS

| | | |
|---|---|---|
| EP | 0 662 758 A2 | 7/1995 |
| GB | 2 275 588 | 8/1994 |
| WO | WO 98/20698 | 5/1998 |

* cited by examiner

Primary Examiner—Wellington Chin
Assistant Examiner—Brenda Pham
(74) Attorney, Agent, or Firm—Coats & Bennett, P.L.L.C.

(57) ABSTRACT

A user terminal is operable to acquire service in a satellite mobile communication network in which plural service providers each communicate via satellite with users on one or more spotbeams each having a select frequency. The user terminal comprises a communication system including a transmitter and a receiver for communicating via a spotbeam. A memory stores frequency information. The frequency information identifies carrier frequencies associated with the spotbeams in the network. The memory further stores identification information identifying a service provider associated with each carrier frequency. A communication controller is operatively associated with the communication system and the memory for selecting a spotbeam carrier frequency to communicate on, the communication controller utilizing identification information to select the spotbeam carrier frequency.

24 Claims, 4 Drawing Sheets

MANAGEMENT OF SPOTBEAM SELECTION INFORMATION IN SATELLITE MOBILE COMMUNICATION SYSTEMS

FIELD OF THE INVENTION

This invention relates to satellite mobile communication systems and, more particularly, to the management of spotbeam selection information in satellite mobile communication systems.

BACKGROUND OF THE INVENTION

Mobile communication systems exist in two basic forms. These forms are terrestrial and satellite. In a terrestrial system a user terminal, such as a mobile phone handset, communicates through the air with a base station in the cell occupied by the user. In a satellite system, the user communicates via a spotbeam from a satellite. In either system the user must acquire service from a particular operator and a respective cell or spotbeam. This is accomplished by searching among available cells in the terrestrial system, or available spotbeams in the satellite system. In a terrestrial system searching is relatively rapid. The radio signals can be acquired very quickly and can be verified quickly. In a satellite system it takes much longer to verify each frequency. This is due to the physical characteristics of satellite mobile communication systems including, for example, low link margin, transmission rate, and configuration of system data.

In a satellite phone system a user terminal is designed to operate to use data which increases the possibility of faster service acquisition. The data is stored in different types of frequency lists which describe primary carriers of the satellite system. The different types of lists might include a list with all primary carriers used by a particular satellite network. There is normally one frequency per spotbeam. This list is broadcast so that user terminals can receive and store the list while operating in a standby mode. Another type of list describes the surrounding spotbeams relative to a spotbeam that a user terminal is camped on. These description lists may include neighbor spotbeams of the same network or satellite, or for spotbeams of a non-serving network or satellite which has overlapping geographical coverage with the serving network. These lists are also broadcast by the network.

How a user terminal uses these lists and other frequency information is subject to the design of the particular user terminal. Nevertheless, in order to acquire service, the user terminal must scan the various lists to find a suitable spotbeam. As mentioned above, this can be a time consuming process.

The present invention is directed to improvements in prior satellite mobile communication systems, but is generally applicable to user terminal operations in complex multi-operator environments.

SUMMARY OF THE INVENTION

In accordance with the invention there is described a user terminal used in a satellite mobile communication system which labels frequency lists to improve management of spotbeam selection information in satellite mobile communication systems.

Broadly, there is disclosed herein a user terminal operable to acquire service in a satellite mobile communication network in which plural service providers each communicate via satellite with users on one or more spotbeams each having a select frequency. The user terminal comprises a communication system including a transmitter and a receiver for communicating via a spotbeam. A memory stores frequency information. The frequency information identifies carrier frequencies associated with the spotbeams in the network. The memory further stores identification information identifying a service provider associated with each carrier frequency. A communication controller is operatively associated with the communication system and the memory for selecting a spotbeam carrier frequency to communicate on, the communication controller utilizing identification information to select the spotbeam carrier frequency.

It is a feature of the invention that the memory stores a history list of carrier frequencies recently used by the user terminal, labeled with the identification information for each of the recently used carrier frequencies.

It is another feature of the invention that the memory stores a neighbor list of carrier frequencies to be monitored by the user terminal labeled with the identification information for each of these carrier frequencies to be monitored.

It is a further feature of the invention that the memory stores an active list of carrier frequencies presently used in the network labeled with the identification information for each of these carrier frequencies.

It is still another feature of the invention that the memory stores a pending list of carrier frequencies to be changed to in the network labeled with the identification information for each of these carrier frequencies.

It is still another feature of the invention that the communication controller includes means for triggering a search for a different service provider than a current service provider that searches among carrier frequencies not identified with the current service provider.

It is still a further feature of the invention that the communication controller includes means for triggering a search for a preselect service provider that searches among carrier frequencies identified with the preselect service provider.

It is an additional feature of the invention that the communication controller includes means for triggering a search for a different spotbeam than a current spotbeam that searches among carrier frequencies identified with the service provider associated with the current spotbeam.

In accordance with another aspect of the invention, there is disclosed a user terminal operable to acquire service in a digital satellite mobile communication network in which plural service providers each communicate via satellite with users on one or more spotbeams each having a select frequency. The user terminal includes a communication system including a transmitter and a receiver for communicating via a spotbeam. A memory stores frequency information. The frequency information identifies carrier frequencies associated with the spotbeams in the network and lists of spotbeams in the network. The memory further stores a public satellite mobile network (PSMN) ID associated with each carrier frequency and/or each list. A communication controller is operatively associated with the communication system and the memory for selecting a spotbeam carrier frequency to communicate on, the communication controller utilizing the PSMN ID to select spotbeam carrier frequency.

There is disclosed in accordance with a further aspect of the invention a method of acquiring service on a user terminal operable in a satellite mobile communication network in which plural service providers each communicate via satellite with users on one or more spotbeams each having a select frequency. The method comprises the steps of communicating via a spotbeam with the network, storing frequency information, the frequency information identifying carrier frequencies associated with the spotbeams in the network, and identification information identifying a service provider associated with each carrier frequency, and selecting a spotbeam carrier frequency to communicate on utilizing the identification information to select the spotbeam carrier frequency.

More particularly, the user terminal when initiating a service acquisition process is able to target the searching process to any PSMN, a particular PSMN, a different than the current PSMN, a different than the current spotbeam, etc. In accordance with the invention, all types of frequency information stored in the user terminal is labeled by a corresponding PSMN ID. Both single frequency and frequency lists are labeled in this manner. Any primary carrier frequency stored in a history list of recently used frequencies is associated in memory with the PSMN that the primary carrier belongs to. Any lists of neighbor frequency information is stored with the PSMN that uses these frequencies. For example, clusters of spotbeams which are neighbors to the currently serving spotbeam are stored labeled with the serving PSMN, while clusters of neighbor spotbeams which belong to another satellite or network are stored with the PSMN identity of that satellite or network. Also, any list of complete primary carrier information and any pending changes to it are stored by the user terminal with the PSMN label these carriers belong to.

Further features and advantages of the invention will be readily apparent from the specification and from the drawing.

DETAILED DESCRIPTION OF THE INVENTION

Figure 1:
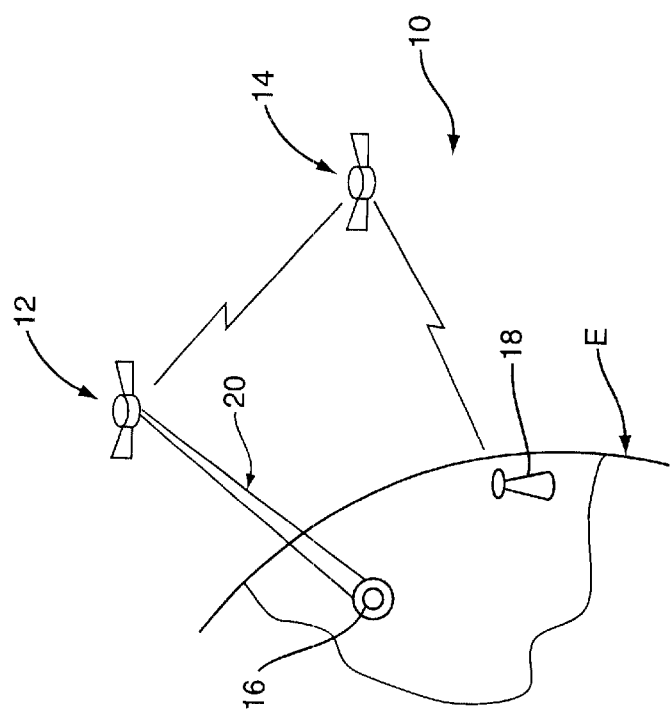
FIG. 1 is a partial perspective view illustrating a user terminal operable to acquire service in a satellite mobile communication network.

Referring initially to FIG. 1, a satellite mobile communication system or network 10 is illustrated in simplified form. Particularly, the system 10 includes plural satellites, two of which labeled 12 and 14 are illustrated. As is well known, satellite mobile communication systems may include numerous satellites orbiting the earth E. In the positions illustrated in FIG. 1, the satellite 12 is positioned in proximity to a user terminal 16, while the satellite 14 is positioned in proximity to a control station 18. The user terminal 16 might be, for example, a mobile phone handset of a subscriber to a particular public satellite mobile network (PSMN) that utilizes the control station 18. Thus, to place or receive phone calls the user terminal 16 communicates in the conventional manner with the first satellite 12, which in turn communicates with the second satellite 14, which in turn communicates with the control station 18.

As is known, in a satellite mobile communication environment plural service providers, also referred to herein as PSMNs, each communicate via single or multi-satellite networks with users on one or more spotbeams each having a select frequency. An example of a spotbeam is illustrated graphically at 20 in FIG. 1. Relative to a conventional terrestrial network, the spotbeam 20 might be equated with a cell. The present invention is directed particularly to how the user terminal 16 manages selection of spotbeams to acquire mobile communications, i.e., phone service.

Figure 2:
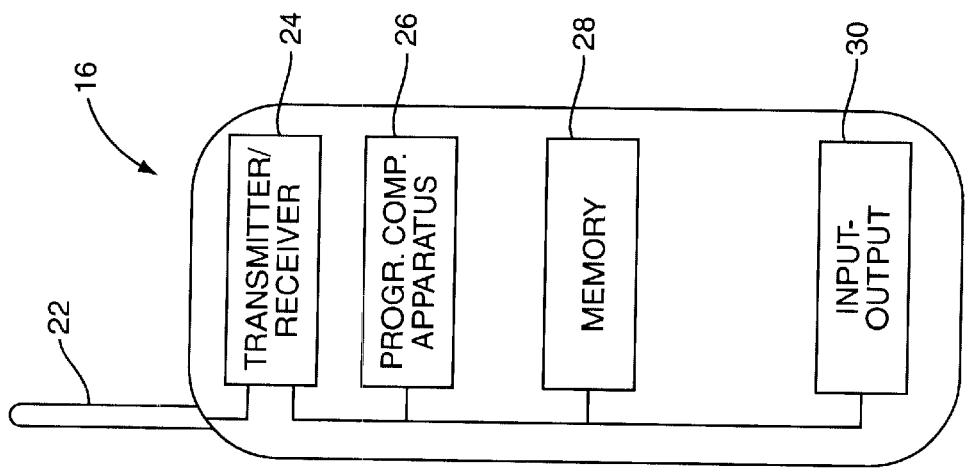
FIG. 2 is a generalized block diagram of a user terminal according to the invention.

FIG. 2 illustrates a typical mobile phone handset embodiment of the user terminal 16. The user terminal 16 includes an antenna 22 for sending and receiving radio signals between itself and the satellite communication system 10. The antenna 22 is connected to a transmitter/receiver circuit 24 to transmit radio signals to the network 10 and likewise respectively receive radio signals from the network 10. A programmable computing apparatus 26 controls and coordinates the functioning of the user terminal 16 responsive to messages on a control channel using programs and data stored in a memory 28. The programmable computing apparatus 26 also controls operation of the user terminal 16 responsive to input from an input/output circuit 30. The input/output circuit 30 may be connected to a keypad as a user input device and a display to give the user information, as is conventional.

In accordance with various standards and specifications, the user terminal 16 initiates a service acquisition process by scanning relevant frequency lists. The frequency lists are stored in the memory 28. The frequency lists are associated with a particular service operator or PSMN. In accordance with the invention, the frequencies and/or frequency lists are labelled with an operator identity in the form of a PSMN ID to distinguish lists and/or frequencies as suitable or not suitable. The labelled frequencies and lists are then used intelligently by the programmable computing apparatus 26 to acquire service.

Particularly, all types of frequency information stored in the memory 28 is labelled by the corresponding PSMN ID. This can be accomplished since any default frequency data, preprogrammed into the user terminal 16 during production, can be complemented by the corresponding PSMN ID. Also, updates of frequency data are stored by the user terminal 16 after it camps on a particular network and the relevant PSMN IDs are available as broadcast data.

Figure 3:
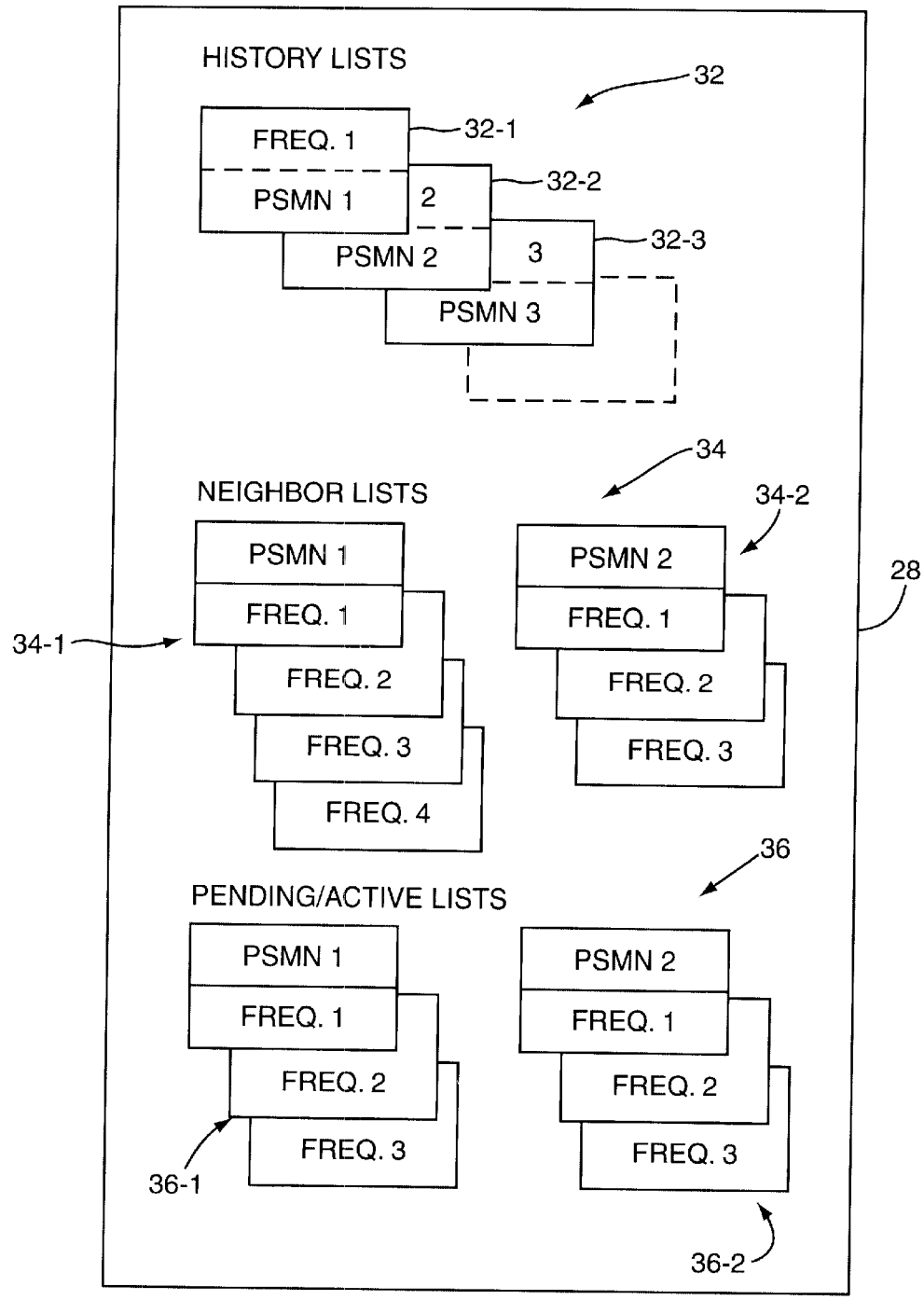
FIG. 3 is a generalized block diagram illustrating frequency lists stored in the memory of the user terminal of FIG. 2.

In accordance with the invention, both single frequencies and frequency lists are labeled with the PSMN ID. As shown in FIG. 3, the memory 28 stores frequency information in the form of history lists 32, neighbor lists 34, and pending/active lists 36. The history list 32 stores any primary carrier frequency of recently used frequencies associated with the PSMN ID that the primary carrier belongs to. For example, as illustrated, frequency 1 is labeled with PSMN1, see 32-1, frequency 2 is labeled with PSMN2, see 32-2, frequency 3 is labeled with PSMN3, see 32-3, etc. The neighbor list 34 stores neighbor frequency information with the PSMN IDs that use these frequencies. For example, cluster spotbeams which are neighbors to the currently serving spotbeam are stored labeled with the serving PSMN, see 34-1, while clusters of neighbor spotbeams which belong to another satellite or network are stored with the PSMN identity of that satellite or network, see 34-2. Also, any list of complete primary carrier information and pending changes to it are stored in the pending/active list 36 with the PSMN ID these carrier frequencies belong to, as is illustrated in 36-1 and 36-2. The active list identifies carrier frequencies presently used in the network and the identification information for each of these carrier frequencies. The pending list identifies carrier frequencies to be changed to in the network and the identification information for each of these carrier frequencies.

Figure 4:
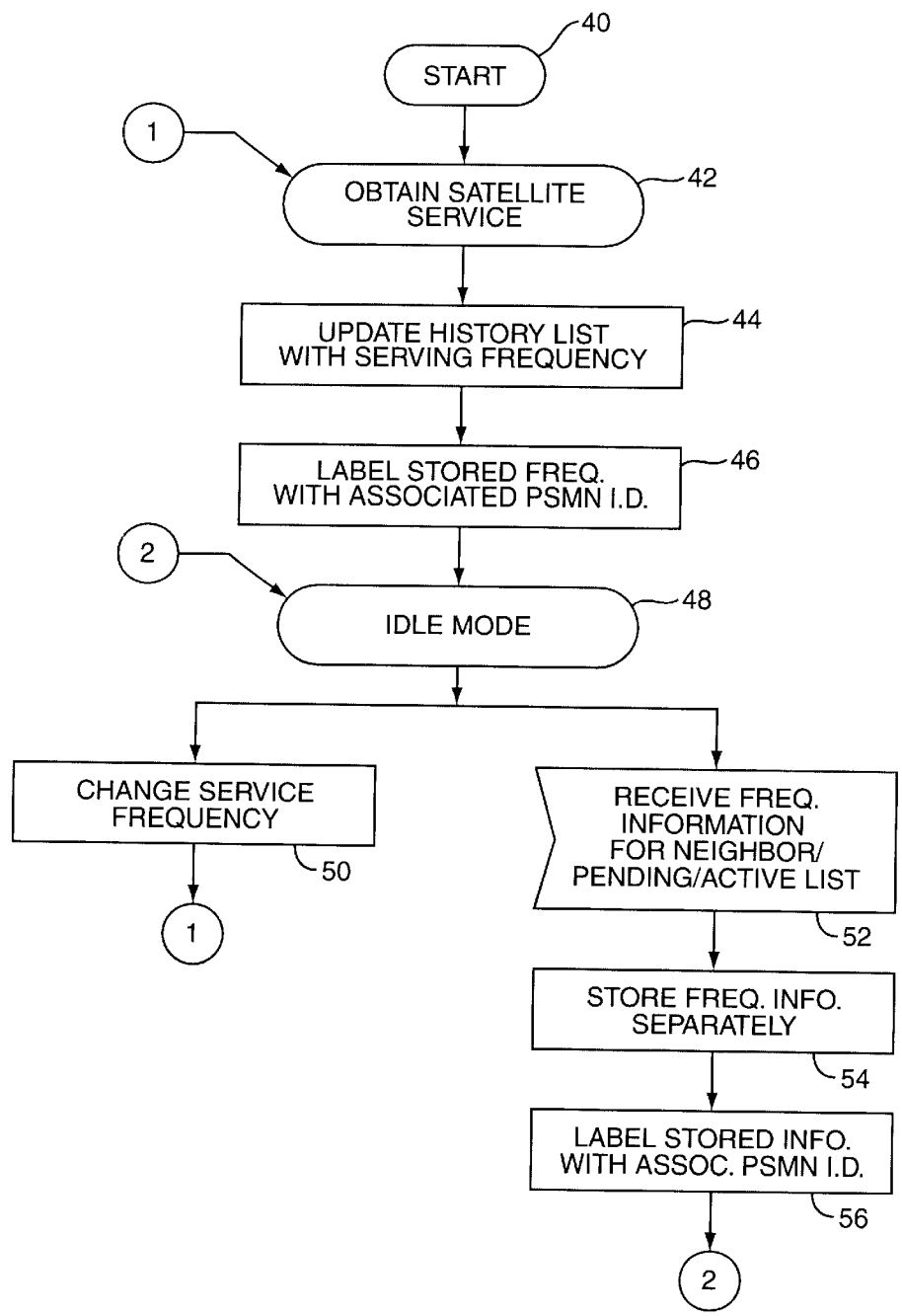
FIG. 4 is a flow diagram implementing a procedure for labelling of stored frequency information in accordance with the invention.

Referring to FIG. 4, a flow diagram illustrates a program implemented by the programmable computing apparatus 26 for the labelling of stored frequency information with the PSMN ID. The program begins at a start node 40 which might be initiated at power-up of the user terminal 16. The user terminal 16 obtains satellite service at a node 42. The procedure for obtaining satellite service is described below relative to FIG. 5. At a block 44, the history list 32, see FIG. 3, is updated with the serving carrier frequency for the service obtained at the node 42. The history list 32 is a private list of the latest frequencies successfully used by the particular user terminal 16. The stored frequency is then labelled with the associated PSMN ID at a block 46. This is done by reading system information received via the particular spotbeam to derive the PSMN ID. The user terminal then enters an idle mode at a node 48. In the idle mode the user terminal 16 continues to listen to spotbeam data in the conventional manner.

While in idle mode, the user terminal 16 can react on different triggering events in order to preserve service continuity. One triggering event occurs if it is necessary to change the service carrier frequency at a trigger block 50. This might occur if the user terminal 16 moves to another spotbeam location, or the current signal has weakened on network command, etc.. Control then proceeds back to the block 42 to obtain satellite service. Alternatively, the user terminal might receive frequency information such as a neighbor list 34 or a pending/active list 36 at a trigger block 52. This information will be received from system data. The neighbor list would comprise a new frequency list describing the present neighborhood of the user terminal 16. The neighbor list typically provides data for the current service operator only. Thereafter, the received frequency information is stored in memory 28 at a block 54. The stored frequency information is then labeled with the associated PSMN ID at a block 56. Control then returns to the idle mode at the node 48.

In accordance with the invention, the labelling of frequency information is used during the service acquisition process. Frequency information is differentiated by the labelling so that the user terminal 16 uses only the relevant information for any type of PSMN or spotbeam selection process. This shortens the selection process and increases the likelihood of selecting a proper service provider.

Figure 5:
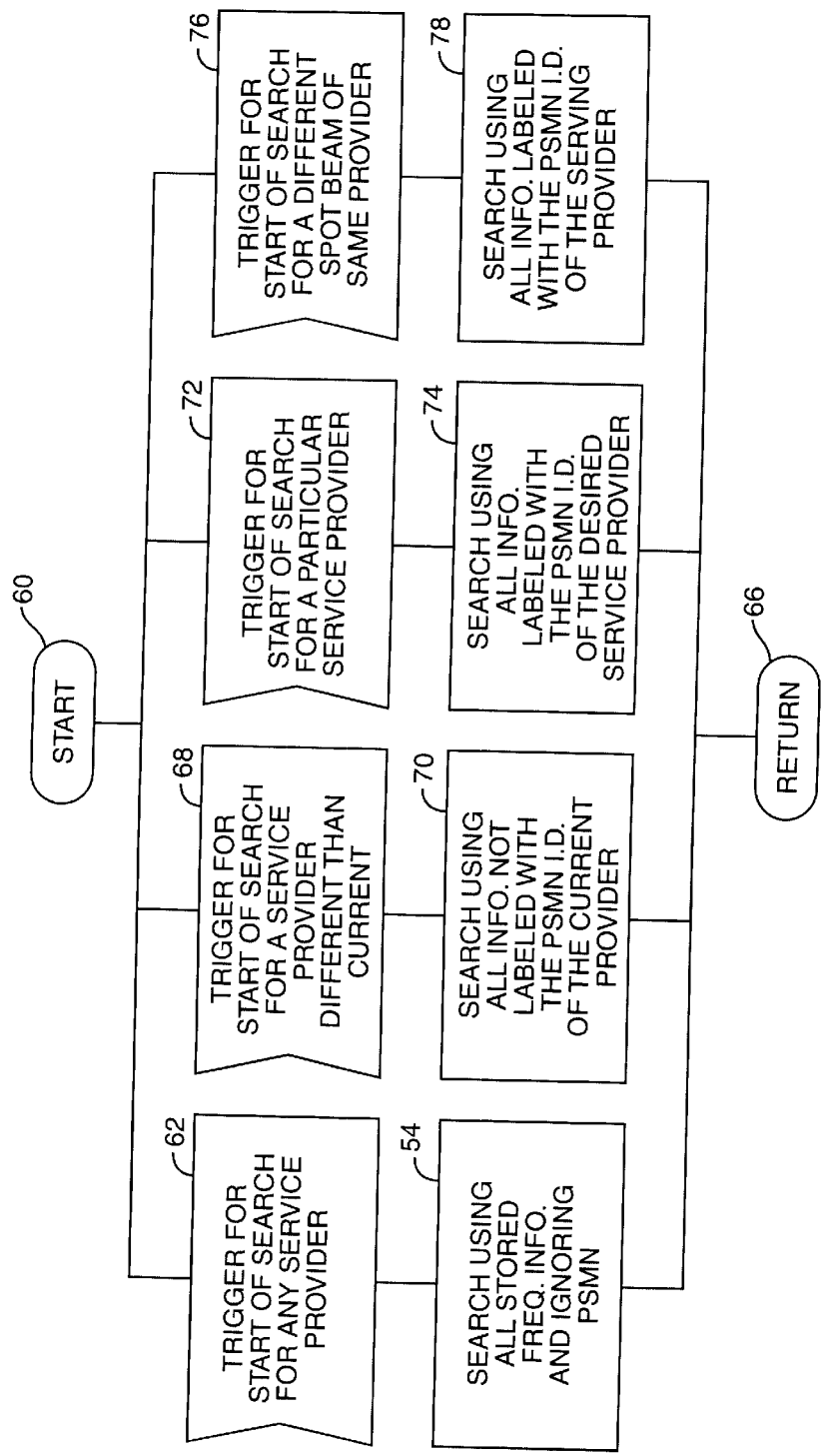
FIG. 5 is a flow diagram illustrating use of label frequency information in acquiring service using the user terminal of FIG. 2.

Referring to FIG. 5, a flow diagram illustrates the procedure implemented by the programmable computing apparatus 26 when the obtained satellite service node 42 of FIG. 4 is called. This process begins at a start node 60. From the start node 60 one of four triggering events determines how the process proceeds. A first trigger block 62 triggers for start of search for any service provider. This is done when searching for any available network that may provide satellite service, such as after turning the user terminal 16 on or after the user terminal 16 enters satellite mode of operations from another mode, such as terrestrial mode, at user request, etc. This is done when no limitations are applicable to the search process. The user terminal 16 searches using all stored frequency information and ignoring PSMN labels at a block 64. The user terminal 16 follows the design in an appropriate search pattern and scans all frequency lists in the memory 28 in order independent of the PSMN ID labels. The routine then ends by proceeding to a return node 66.

A second trigger block 68 triggers for the start of search for a service provider different from the current service provider. Searches of this type might be triggered by the network due to limitations or rejection of service to single user terminal 16 or groups of user terminals. User terminal location update attempts which are rejected by the network with cause values "PSMN Not Allowed" or "National Roaming Not Allowed in this Area" are typical network-caused searches for a different PSMN. Search of a different PSMN can also be requested by the user at any time of user terminal operation. In response to this triggering event, the user terminal searches using all frequency information that is not labelled with the PSMN ID of the current service provider at a block 70. This is done by the user terminal 16 filtering out any frequency data, both for single frequencies in the history list 32 or lists such as the neighbor list 34 or an active list 36 which are labelled with the currently serving PSMN ID. The routine then proceeds to the return node 66.

The third trigger block 72 triggers for the start of a search for a particular service provider. This type of search is usually initiated at user request. For example, after the user selects a PSMN from a user terminal memory list of operators and instructs the user terminal 16 to search for it. The search is performed using all information labelled with the PSMN ID of the desired service provider at a block 74. This is done by applying frequency data which is labelled with the desired PSMN ID for either single frequencies in the history list 32 or any type of list in the neighbor list 34 or active list 36.

The fourth trigger block 76 triggers for the start of search for a different spotbeam of the current or same service provider. Initiation of this type of spotbeam search includes user terminal location update procedures which are rejected by the network which cause "LAI Not Allowed", or the serving spotbeam becoming barred for service provision. The search is performed using all information labelled with the PSMN ID of the current serving provider at a block 78. Again, this applies single frequencies from the history list 32 or lists from the neighbor list 34 or active list 36 that are labeled with the currently serving PSMN ID.

By administering and using the labeled frequencies and frequency lists as described, the user terminal 16 has access to the appropriate and optimal amount of information during all PSMN or spotbeam selection processes. Since the amount of stored frequency information does not impact the duration of the particular selection process, because not all information is used all the time, the user terminal 16 may store a more extensive amount of information to additionally improve the chances of acquisition of satellite service, which is the ultimate goal of the selection process.

Thus, in accordance with the invention, the management of the spotbeam selection information for service acquisition shortens the process and improves the chance of success. This should enhance the user satisfaction of user terminal operations.

We claim:

1. A user terminal operable to acquire service in a satellite mobile communication network in which plural service providers each communicate via satellite with users on one or more spotbeams each having a select frequency, the user terminal comprising:

a communication system including a transmitter and a receiver for communicating via a spotbeam;

a memory for storing frequency information, the frequency information identifying carrier frequencies associated with the spotbeams in the network, the memory further storing identification information identifying a service provider associated with each carrier frequency; and a communication controller operatively associated with the communication system and the memory for selecting a spotbeam carrier frequency to communicate on, the communication controller utilizing the identification information to select the spotbeam carrier frequency.

2. The user terminal of claim 1 wherein the memory stores a history list of carrier frequencies recently used by the user terminal labeled with the identification information for each of the recently used carrier frequencies.

3. The user terminal of claim 1 wherein the memory stores a neighbor list of carrier frequencies to be monitored by the user terminal labeled with the identification information for each of these carrier frequencies to be monitored.

4. The user terminal of claim 1 wherein the memory stores an active list of carrier frequencies presently used in the network labeled with the identification information for each of these carrier frequencies.

5. The user terminal of claim 1 wherein the memory stores a pending list of carrier frequencies to be changed to in the network labeled with the identification information for each of these carrier frequencies.

6. The user terminal of claim 1 wherein the communication controller includes means for triggering a search for a different service provider than a current service provider that searches among carrier frequencies not identified with the current service provider.

7. The user terminal of claim 1 wherein the communication controller includes means for triggering a search for a preselect service provider that searches among carrier frequencies identified with the preselect service provider.

8. The user terminal of claim 1 wherein the communication controller includes means for triggering a search for a different spotbeam than a current spotbeam that searches among carrier frequencies identified with the service provider associated with the current spotbeam.

9. A user terminal operable to acquire service in a digital satellite mobile communication network in which plural service providers each communicate via satellite with users on one or more spotbeams each having a select frequency, the user terminal comprising:

a communication system including a transmitter and a receiver for communicating via a spotbeam;

a memory for storing frequency information, the frequency information identifying carrier frequencies associated with the spotbeams in the network and lists of spotbeams in the network, the memory further storing a public satellite mobile network (PSMN) ID associated with each carrier frequency and each list; and a communication controller operatively associated with the communication system and the memory for selecting a spotbeam carrier frequency to communicate on, the communication controller utilizing the PSMN ID to select the spotbeam carrier frequency.

10. The user terminal of claim 9 wherein the memory stores a history list of carrier frequencies recently used by the user terminal labeled with the PSMN ID for each of the recently used carrier frequencies.

11. The user terminal of claim 9 wherein the memory stores a neighbor list of carrier frequencies to be monitored by the user terminal labeled with the PSMN ID for each of these carrier frequencies to be monitored.

12. The user terminal of claim 9 wherein the memory stores an active list of carrier frequencies presently used in the network labeled with the PSMN ID for each of these carrier frequencies.

13. The user terminal of claim 9 wherein the memory stores a pending list of carrier frequencies to be changed to in the network labeled with the PSMN ID for each of these carrier frequencies.

14. The user terminal of claim 9 wherein the communication controller includes means for triggering a search for a different PSMN than a current PSMN that searches among carrier frequencies not identified with the current PSMN.

15. The user terminal of claim 9 wherein the communication controller includes means for triggering a search for a preselect PSMN that searches among carrier frequencies identified with the preselect PSMN.

16. The user terminal of claim 9 wherein the communication controller includes means for triggering a search for a different spotbeam than a current spotbeam that searches among carrier frequencies identified with the PSMN associated with the current spotbeam.

17. A method of acquiring service on a user terminal operable in a satellite mobile communication network in which plural service providers each communicate via satellite with users on one or more spotbeams each having a select frequency, the method comprising the steps of:

communicating via a spotbeam with the network;

storing frequency information, the frequency information identifying carrier frequencies associated with the spotbeams in the network and identification information identifying a service provider associated with each carrier frequency; and selecting a spotbeam carrier frequency to communicate on utilizing the identification information to select the spotbeam carrier frequency.

18. The method of claim 17 wherein the storing step stores a history list of carrier frequencies recently used by the user terminal labeled with the identification information for each of the recently used carrier frequencies.

19. The method of claim 17 wherein the storing step stores a neighbor list of carrier frequencies to be monitored by the user terminal labeled with the identification information for each of these carrier frequencies to be monitored.

20. The method of claim 17 wherein the storing step stores an active list of carrier frequencies presently used in the network labeled with the identification information for each of these carrier frequencies.

21. The method of claim 17 wherein the storing step stores a pending list of carrier frequencies to be changed to in the network labeled with the identification information for each of these carrier frequencies.

22. The method of claim 17 wherein the selecting step includes triggering a search for a different service provider than a current service provider that searches among carrier frequencies not identified with the current service provider.

23. The method of claim 17 wherein the selecting step includes triggering a search for a preselect service provider that searches among carrier frequencies identified with the preselect service provider.

24. The method of claim 17 wherein the selecting step includes triggering a search for a different spotbeam than a current spotbeam that searches among carrier frequencies identified with the service provider associated with the current spotbeam.

* * * * *